Dec. 22, 1959     A. G. THOMAS     2,917,890
POWER DRIVEN LAWN MOWER AND TRIMMER

Filed June 23, 1955     3 Sheets-Sheet 1

INVENTOR.
Albert G. Thomas
BY
ATTYS

Dec. 22, 1959  A. G. THOMAS  2,917,890
POWER DRIVEN LAWN MOWER AND TRIMMER
Filed June 23, 1955  3 Sheets-Sheet 3

INVENTOR.
Albert G. Thomas
BY
ATTYS.

United States Patent Office 2,917,890
Patented Dec. 22, 1959

---

2,917,890

POWER DRIVEN LAWN MOWER AND TRIMMER

Albert G. Thomas, Miami, Fla.

Application June 23, 1955, Serial No. 517,496

6 Claims. (Cl. 56—25.4)

This invention relates generally to lawn trimming or mowing machines and is directed particularly to improvements in power driven mowers of the type having rotary cutting blades arranged around and radially of their axis of rotation.

The present invention contemplates the provision in a power lawn mower of rotary cutting blades supported to turn in a horizontal plane, in association with other blades mounted for rotation in a vertical plane, with certain new and novel features associated with both blade arrangements whereby the efficiency of the machine as a whole is materially improved.

Prior power driven mowers are known which have rotating blades supported to turn in a horizontal plane and other rotating blades mounted to turn in a vertical plane, but in such machines the positions of the blades on the wheeled frame or body of the machine have no particular significance, the blades being merely mounted in such a way as to perform their desired functions.

An object of the present invention accordingly is to provide in a power mower having a wheel supported body, rotatably supported trimmer blades mounted to turn in a vertical plane and also to be lowered from a non-working position to a working position, which blades have a prescribed relationship to the main body supporting wheels whereby a trimming operation can be executed along a circular path of small radius thereby making it possible to trim curved borders as, for example, around a tree or small circular flower bed, with a minimum of manual effort in guiding the mower.

More specifically it is an object to provide a power mower of the above described character wherein the said trimmer blades are supported to swing about a horizontal axis which is so positioned with respect to the axis of rotation of the main supporting wheels that the two axes will come into alignment when the trimmer blades are lowered to operative or trimming position.

In power mowers of known construction which have rotary cutting blades mounted to turn in a horizontal plane, it is difficult to trim or cut grass close to a body, such as a wall, fence or the like, without the danger of having the blades strike the body, and it is accordingly another object of this invention to provide means whereby this operation may be performed efficiently and without the risk of damaging the blades or scarring the body adjacent to which the grass is being trimmed.

Another condition associated with trimming grass or other vegetation close to a body such as a wall or the like, which makes the operation difficult, resides in the fact that the vegetation may be lying so close to the body that the rotating blades cannot reach and cut the same without striking the adjacent body.

A further object of the present invention, in view of the foregoing, is to provide a new, simple and efficient means whereby the grass or other vegetation may be engaged and drawn away from the body and into the path of rotation of the blades so that it can be cut without having to bring the blades into close proximity to the body or structure adjacent to which the grass or other vegetation is growing.

The manner in which the foregoing and other objects may be attained will be best understood from the following detail description taken in connection with the accompanying drawings, with the understanding that the invention is not confined to a strict conformity with the showing of the drawings but may be changed or modified so long as such changes or modifications mark no material departure from the salient features of the invention as expressed in the appended claims.

In the drawings:

Fig. 5 is an enlarged vertical section taken substantially on the line 5—5 of Fig. 1;

Fig. 6 is a vertical transverse section taken substantially on the line 6—6 of Fig. 1;

Fig. 7 is an enlarged view looking at the underside of the guard plate for the horizontally rotating cutter blades at the outer edge and showing the grass pick-up element in applied position;

Fig. 8 is an enlarged view in perspective of the grass pick-up element detached from the guard plate.

Figure 1:
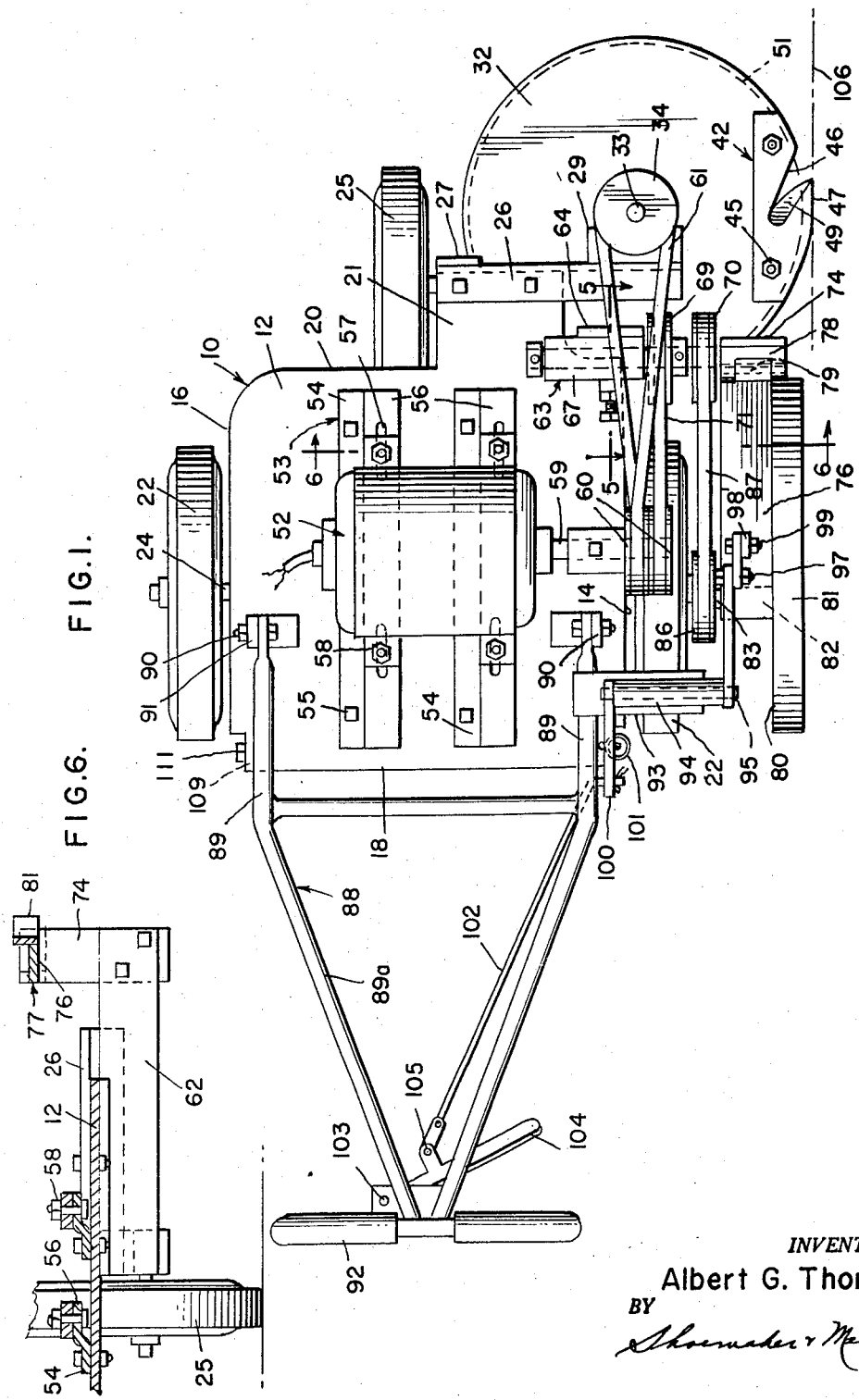
Fig. 1 is a view in top plan of a power mower constructed in accordance with the preferred embodiment of the present invention.

Referring now more particularly to the drawings, the numeral 10 generally designates the body of the power mower of the present invention which body is here shown as comprising a flat plate 12 of metal, the right and left side edges of which are designated 14 and 16 respectively, while the back is designated 18 and the front edge is designated 20. A portion of the front edge of the plate is extended forwardly in the form of an integral extension which is designated 21 and the function of which will be hereinafter set forth.

The body of the mower machine is supported in a suitable manner upon two main supporting wheels 22 which are positioned at opposite sides of the plate 12. While any suitable means for supporting the plate or body upon these main wheels may be provided, the construction here illustrated embodies a pair of depending bearing brackets 23 secured to the underside of the plate 12 approximately midway the ends of the right and left edges 14 and 16 with an axle 24 rotatably supported at its ends in the bearing brackets and projecting beyond the side edges of the body plate and having the main wheels 22 mounted thereon.

In addition to the two main supporting wheels 22 there is provided a smaller forward or lead wheel 25 which is located at the left side of the extension 21 of the body plate.

The lead wheel 25 is rotatably connected with the front of the machine body in the following manner. Disposed across the forward edge of the plate body extension 21 is a bracket arm 26 which is here shown as being in the form of an angle iron but which may be constructed in any other suitable manner. One end of this bracket arm 26 is welded or otherwise suitably attached to the extension 21 with an end portion extending a substantial distance to the right of the body plate extension 21, as is most clearly shown in Fig. 1. Secured to and extending downwardly from the bracket arm 26 is an axle plate 27 across the lower end of which extends the stub axle 28 which is secured to this bearing plate by welding or in any other suitable manner and this stub axle has the lead wheel 25 rotatably mounted thereon.

The bracket arm 26 carries on the extended end, that is the end portion extending laterally from the plate extension 21, a mounting block 29, the forward face of which is provided with a vertical recess in which is seated a vertical sleeve 30. This sleeve is held in vertically adjusted position by a pair of U-bolts 31 which encircle the sleeve and extend rearwardly through the mounting block as is clearly illustrated in Fig. 4. By means of these bolts, the sleeve can be moved up or down when the binding nuts on the bolts are loosened and set at the proper elevation for supporting the hereinafter described horizontally rotating cutter blades.

The lower end of the sleeve 30 is secured by welding or in any other suitable manner to the center of a circular guard plate 32 which has a suitable central opening, not shown, for the extension therethrough of the lower end of the vertical cutter blade shaft 33 which is suitably rotatably mounted in the sleeve and which projects at its upper end beyond the top end of the sleeve and has secured thereto the V-belt pulley 34.

Figure 3:
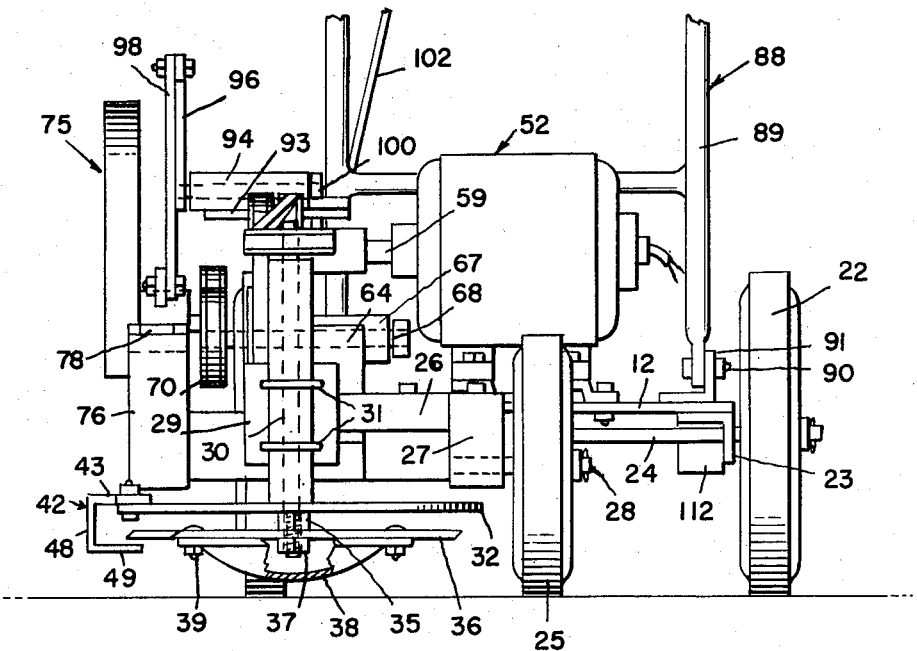
Fig. 3 is a view in front elevation of the machine.

The lower end of the shaft 33 is maintained in position against upward movement by a collar 35, shown in Fig. 3, and below this collar the shaft 33 extends through a cutter bar 36 and the cutter bar is maintained in position by the nut 37 which is threaded upon the lower end of the shaft as shown.

Lying against the underside of the cutter bar is the circular downwardly projecting or convexed shield 38 which is attached at its periphery by bolts 39 to the cutter bar inwardly of the ends of the latter. This shield functions to engage the surface of the ground where the mower may run over an uneven area and prevent the blades from digging into the ground.

It will be seen upon reference to Fig. 1 that the shaft 33 for the horizontal cutter blades, which blades comprise the outer end portions of the cutter bar 36, is disposed approximately in line with or to the right of the right hand edge 14 of the body plate 12. Thus the circular guard disc 32 has approximately half its diameter lying to the right of the body plate and the cutter blades or ends of the cutter bar 36 will function laterally of the body plate in the operation of the machine.

The outer or right hand portion of the guard plate 32 is cut away along a line paralleling the adjacent edge 14 of the body plate, which edge is designated 40, reference being had to Fig. 7. As is also shown in this figure, this edge 40 is provided with a notch 41 which opens forwardly and laterally.

Secured to the top of the guard plate 32 over the edge 40 thereof is the grass pick-up unit which is generally designated 42. This unit comprises a short plate body 43 having a curved outer edge portion 44 which is of the same radius of curvature as the guard plate 32 so that when this plate 43 is placed upon the top of the guard plate as shown in Fig. 1, where it is secured by bolts 45 or in any other suitable manner, the curved edge 44 will coincide with the curvature of the plate and continue such curvature across the chordal edge 40.

The pick-up plate 43 is provided with an obliquely directed slot 46 which coincides with the notch 40 as shown in Fig. 7, and at the outer side of this slot the curved edge portion 44 of the plate 43 is extended along a line tangential to the edge 44 as indicated at 47 and which line is parallel to the adjacent or right hand edge 14 of the body plate. The forward end of this tangential edge portion 47 terminates at the forward end of the outer side of the slot 46 and formed integral with the plate 43 and extending downwardly from the edge 47 and in the plane thereof is guard plate 48 to the lower edge of which is attached the inwardly extending tongue 49 which has an inwardly and rearwardly curving edge portion 50. This tongue projects inwardly beyond the slot 46 and across the latter but spaced downwardly therefrom as will be readily seen from reference to Fig. 8.

The length of the cutter bar 36 is such that in the rotation thereof the cutting end portions will pass between the tongue 49 and the plate 43, as indicated by the dotted line 51 in Fig. 7, thus, of course, sweeping across the guide slot 46.

The function of the unit 42 in the operation of the mower will be hereinafter more particularly described.

The numeral 52 generally designates a source of motive power for the machine which is here illustrated as an electric motor which is supported upon the top of the body plate 12. It is to be understood, however, that in place of this motor an internal combustion engine of the type commonly employed for power mowers may be used if desired. Therefore, it is understood that the invention is not confined to the use of any specific power source for operating the machine.

For supporting the power source upon the body plate 12 there are provided the two spaced parallel ways each of which is designated 53 and which extend longitudinally of the plate as shown in Fig. 1. Each of these ways comprises a longitudinal base portion 54 which rests upon the top of the plate 12 and is secured thereto by bolts 55 and the offset flange 56 which is maintained in slightly elevated relation to the base plate 12 and which is provided with suitable longitudinally extending slots 57 for the reception of bolts 58 by which the motor 52 or other power unit is held in position.

With this construction it will be seen that the bolts 58 may be inserted through the slots 57 prior to the securement of the ways to the body plate 12 so that the heads of the bolts will be confined between the flanges 56 and the body plate 12 and the bolts will thus be prevented from coming out and being lost and at the same time they can be easily shifted longitudinally of the ways to place them in the most desirable position for securing the motor unit in place.

The motor unit or power source 52 is shown as having the power-delivering shaft 59 which is directed toward the right side of the machine and which has secured thereon the dual V-pulley 60. One pulley 60 is in driving connection with the pulley 34 by means of the V-belt 61 whereby rotary power is delivered from the motor or power source to the horizontally rotating cutter bar 36.

Secured to the forward part of the body plate 12, preferably along the edge 20 on the right hand side of the forward extension 21, is a bracket bar or arm 62 which is here shown as being in the form of an angle bar but which may be of any other suitable or desired cross-sectional form. This bracket bar or arm 62 extends a substantial distance outwardly beyond the right hand edge 14 of the body plate 12 and provides a support for the following units of the machine.

Inwardly of the right hand end of the bracket bar 62 there is secured an adjustable pulley unit which is generally designated 63, which pulley unit comprises an upstanding plate 64 which is pivotally mounted at its lower end for oscillation on an axis extending transversely of the machine or lengthwise of the bar 62, the upper end of the plate 64 extending a substantial distance above the top of the body plate 12. Any suitable pivot or bearing means may be provided for the lower end of the plate 64, the construction comprising trunnions 65 extending from opposite edges of the plate 64 at the bottom end thereof and mounted for turning movement in the spaced short sleeves 66 which are welded or otherwise suitably attached to the lower part of the bracket bar or arm 62, as shown in Fig. 5.

Secured to the top end of the plate 64 is the relatively long horizontally disposed bearing sleeve 67 which, as shown in Fig. 1, is directed transversely of the machine body. This bearing sleeve has rotatably supported therein an end portion of a pulley shaft 68 which carries the two V-pulleys 69 and 70 on the outer right hand end as shown in Fig. 1. The inner one of these pulleys which is designated 69, is connected by a V-belt 71 with one of the pair of pulleys 60 carried on the shaft of the motor unit 52.

As previously stated, the plate 64 carrying the pulleys 69 and 70 is pivotally supported for rocking movement toward and away from the pulleys 60 and by this means the belt 71 may be tightened as desired, the means employed for effecting such tightening comprising an adjusting screw 72 which is threaded through a fixed nut 73 carried upon the top of the bracket bar or arm 62 as shown in Fig. 5 at the rear side of the plate 64. It will be seen from reference to this figure that by threading the adjustment screw 72 forwardly, the forward end of this screw will press against the plate 64 so as to move it or swing it in a way to tighten the belt 71. After the proper adjustment has been made of the screw 72, its position may be fixed by the lock nut 72$^a$.

The outer end of the bracket bar or arm 62, outwardly from the pulley carrying plate 64, has rigidly secured thereto the upstanding support plate 74 which extends a substantial distance above the body plate 12. This plate 74 supports the vertically swingable trimmer unit which is generally designated 75 and which embodies a cutter bar or cutter blades hereinafter described, mounted for rotation in a vertical plane.

The unit 75 comprises an arm plate 76 which is pivotally attached at the end 77, which will be defined as the forward end, to the upper end of the support plate 74, to swing on a horizontal transversely extending axis. This pivotal connection between the arm plate 76 and the support plate 74 may be of any suitable character but is here illustrated as comprising a pair of spaced hinge ears 78 in which are engaged the ends of a pivot pin 79, see Fig. 1, which is secured across the forward end of the arm plate 76.

Disposed against the outer side of the arm plate 76 is a vertical shield 80 which has an arcuate top edge defined by an outstanding flange 81.

The rear end of the arm or arm plate 76 carries a transverse bearing sleeve 82 in which is rotatably mounted a cutter bar shaft 83 the outer end of which extends through the shield plate 80 and has secured thereon the cutter bar 84, the outer end portions of which are sharpened as indicated at 85 to form cutting blades.

At the inner end of the shaft 83 and upon the inner side of the arm plate 76, the shaft has secured thereon a V-belt pulley 86 and connecting this pulley with the pulley 70 is a belt 87.

The pivot mounting for the arm plate 76 is located with respect to the main wheel axle 24 so that when the arm is swung in a vertical path the center of the cutter shaft 83 will swing across the adjacent end of the axle 24. In other words, the mounting of the pivot shaft for the cutter bar 84 is such that when the cutter bar is lowered for trimming along an edge of a flower bed, the axes of the shaft 83 and axle 24 may be brought into alignment. By this arrangement it will be seen that the entire mower can be maneuvered around a circular bed of relatively small diameter without difficulty as the point of contact between the inner or right hand wheel 22 with the ground on which the machine turns can be made to follow the curve of the flower bed or other curved body. Obviously the outer wheel 22, or the left hand wheel, will during this maneuver turn or rotate faster than the inner wheel, as the wheels 22 are mounted for independent rotation and since the lead wheel 25 is at the front of the machine and carries very little weight, it may be either lifted from the ground or made to only lightly contact the ground by bearing down slightly on the handle bars 92 so that no material drag will be imposed on the machine in operating it in the manner stated. By this mounting of the edger blade shaft so that it can be brought in line with the main wheel axle, it is possible to cut circles of small diameter around trees, shrubbery, etc.

The body 10 has connected therewith a steering handle which is generally designated 88. This handle is here illustrated as comprising the two spaced legs 89 each of which is pivotally attached at one end by a bolt 90 to a bracket 91 carried upon the top of the body plate 12 adjacent to the rear thereof so that the legs may be swung vertically. These legs 89 have the rearwardly converging portions 89$^a$ which terminate at their rear ends at the center of a transverse handle bar 92 to which they are rigidly connected.

The steering handle leg 89 on the right side of the machine has secured thereacross adjacent to the rear end of the arm plate 76, a bearing supporting plate 93. Secured upon the plate 93 to extend across the adjacent leg 89 is a bearing sleeve 94 through which extends a shaft 95. The outer or right hand end of the shaft 95 has rigidly attached thereto an end of the crank arm 96 to the other or outer end of which is pivotally connected by means of a bolt 97, or in any other suitable manner, an end of a link 98. This link extends downwardly from the end of the crank arm 96 toward the underlying arm plate 76 to which it is pivotally connected by means of a bracket ear 98' and a pivot bolt 99.

The inner or left hand end of the shaft 95 has rigidly secured thereto one end of a short crank arm 100. This arm may be substantially parallel with the arm 96, as shown in Fig. 2, or otherwise directed so that it will extend rearwardly and downwardly while the first mentioned crank arm 96 extends forwardly and upwardly.

Figure 2:
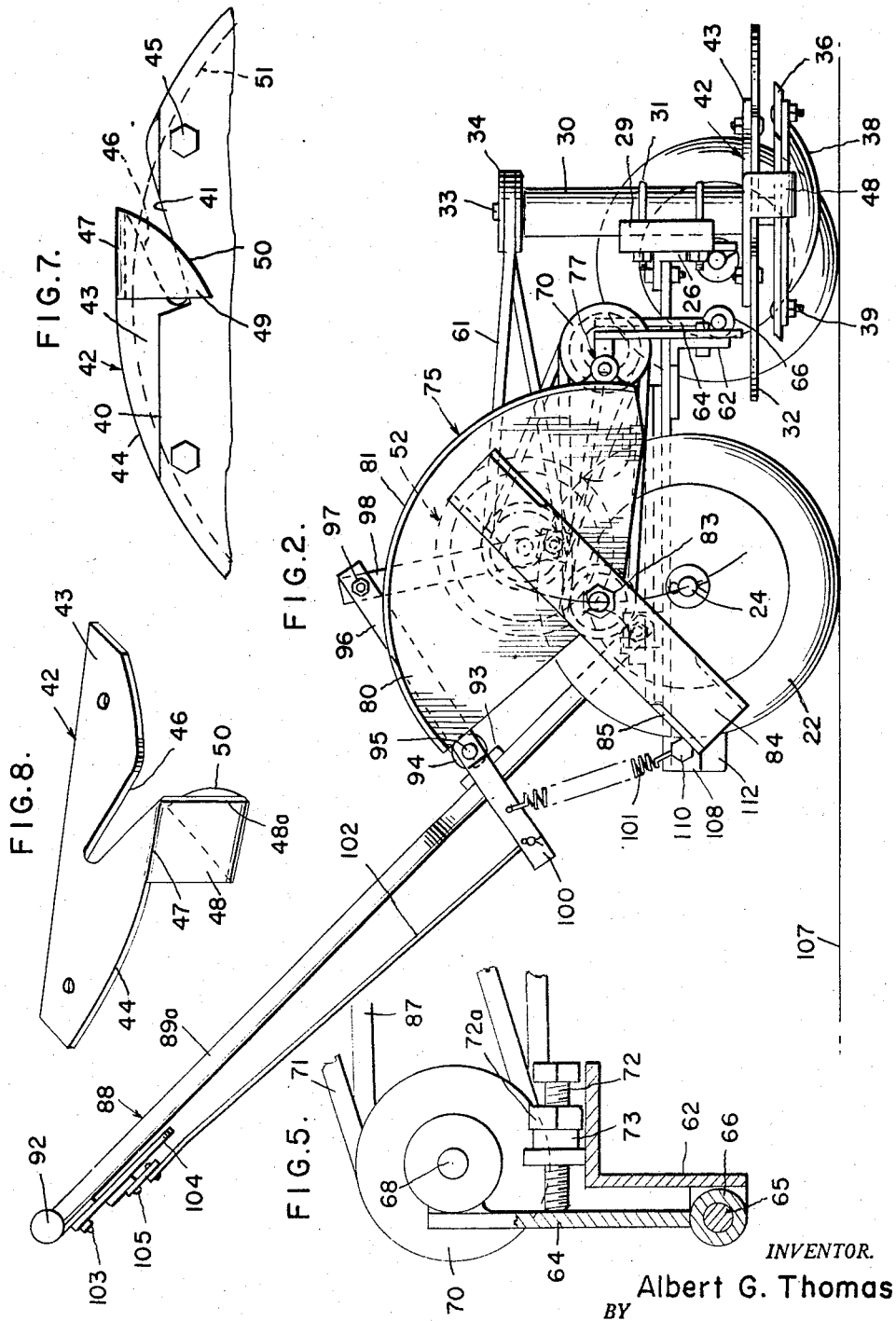
Fig. 2 is a view in elevation of the right side of the mower showing the vertically movable trimmer blades in raised or elevated non-working position.

Connecting the inner crank arm 100 with the underlying body plate 12 is the coil spring 101 which is normally under tension to pull down on the crank arm to which it is attached and thus elevate the free end of the arm 96 to raise and maintain in inoperative position the trimmer unit, as illustrated in Fig. 2.

The crank arm 100 also has connected therewith an end of a pull rod 102 which extends upwardly and rearwardly toward the hand grip or handle bar 92, as shown in Fig. 1.

Pivotally mounted on the bar 92 as at 103 is an end of a control lever 104 and this lever has the other end of the pull rod 102 pivotally coupled thereto as at 105 at a point between the pivot 103 and the free end of the lever so that when the lever 104 is pulled rearwardly the rod 102 will pull up upon the crank arm 100 and swing the other arm 96 downwardly to force the trimmer unit down into its operative position and also to bring the shaft 83 upon which the knife bar 84 is mounted into the desired alignment with the axle 24 in the manner previously described.

In addition to the novel arrangement of the trimmer unit whereby the axis of rotation of the knife bar is brought into alignment with the axle 24 for the purpose before stated, it will be seen that by the provision of the novel construction of the right hand side of the shield disc 32 for the horizontally rotating cutter, the mower may be operated in close proximity to a wall or other structure, indicated by the broken line 106 in Fig. 1 to effect the engagement and removal from against the wall of the body of blades of grass and movement of the latter into the path of travel of the cutting end portions of the cutter bar.

The vertically disposed guard plate 48 may be moved along the surface of and in contact with the wall or other body and by beveling the forward edge of this plate as indicated at 48ª, it will effectively slide between any blades of grass and the wall and cause the grass blades to be pulled out and into the slot 46 so that they may be easily severed by the rotating knife bar.

Figure 4:
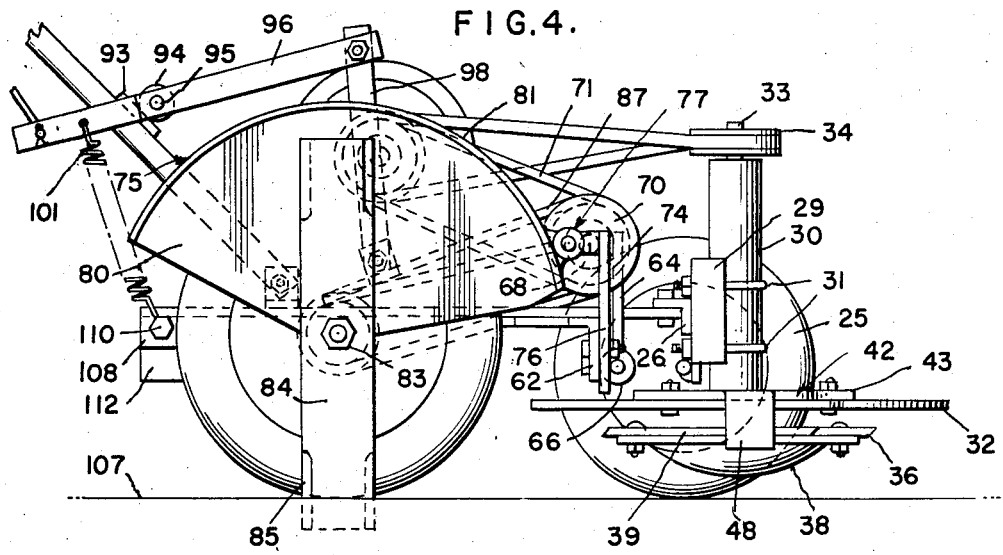
Fig. 4 is a view of the right side of the machine showing the vertically rotating trimmer blades in lowered or working position where the axis of rotation for the blades is aligned with the axle of the main supporting wheels.

It will be noted upon reference to Fig. 1 that this guard plate 48 lies slightly outside of or to the right of the vertical plane in which the trimmer cutter bar 84 rotates. Thus the ends of the cutter bar 36 will intersect the vertical plane of rotation of the trimmer cutter bar 84 so that when the trimmer is operated along the edge of a flower bed where the cutting edges will extend below the surface of the ground as shown in Fig. 4 where the ground level is designated 107, the horizontal cutter will trim the grass right up to the edge which is being cut by the cutter bar 84, thereby making a neat border outline.

The body plate 12 has a portion of each corner at the back edge thereof turned down forming on the right side the depending ear 108 and a corresponding ear 109 on the opposite or left side. The ear 108 is here shown in Fig. 2 as having a screw or bolt 110 secured therein to which the lower end of the spring 101 may be attached while the opposite downturned ear 109 has threaded therethrough a bolt or machine screw 111 which secures against the underside of the body plate a weight member 112, shown in Fig. 3, which functions to counterbalance the elements mounted upon the opposite or right hand side of the body.

From the foregoing it will be seen that there is provided by the present invention a power mowing machine having new and novel features in the provision of the means for drawing grass or other vegetation away from walls or other structures so that the grass can be effectively trimmed right up to such structures by the horizontally rotating cutter 36 and in the provision of the novel mounting for the vertically movable trimmer unit whereby the machine can be easily maneuvered around circular beds for trimming the edges thereof, even where such beds may be of small diameter. It will be readily apparent that in the operation of trimming a circular bed of small diameter it is only necessary for the operator to follow the edge of the bed with the inner or right hand main wheel and the trimming knife will always be in the proper position to cut along the edge of the bed, whereas if the knife were positioned so that the supporting shaft therefor were ahead of or behind the main wheel axle, it would be necessary for the operator to trim a little bit along the edge of the border and then shift the position of the machine to bring the knife back into position to trim a little more and this operation would have to be repeated until the trimming operation was completed.

I claim:

1. A power operated grass cutting machine of the character described comprising a body, main supporting wheels for and upon opposite sides of the body, a lead wheel positioned forwardly of and connected with the body, means for supporting a prime mover upon the body, an upstanding plate pivotally mounted upon the forward part of the body for turning on an axis extending across the body, a pair of coupled pulleys supported on said plate for rotation on an axis paralleling the first axis, a belt driving connection between one of said pulleys and the prime mover, means carried by the body and operatively coupled with said plate for effecting the pivotal turning of the plate in a fore and aft direction to alter the working position of said pair of pulleys, said last means holding the plate in adjusted position, a support plate rigidly secured to the forward part of the body upon the outer side of said pivoted upstanding plate, an arm having pivotal connection at one end with the support plate for vertical swinging about an axis approximately in the horizontal plane of the axis of rotation of said pair of pulleys, said pivotal connection being positioned slightly rearwardly of said axis of the pulleys, cutting blades rotatably carried by said arm for turning in a vertical plane on an axis paralleling the axis of said main supporting wheels, a driving connection between the other one of said pair of pulleys and said blades, said upstanding pivoted plate when turned in a forward direction effecting the tightening of said connection, means for tightening the driving connection between said one pulley and the prime mover, a control handle connected with the body, and means operable from the control handle for effecting vertical swinging of said arm.

2. The invention according to claim 1, wherein said vertically swinging arm is of a length so that said blades may be swung down to a working position in which the axis of rotation of the blades is aligned with the axis of the main supporting wheels.

3. A power grass cutting and trimming machine, comprising a body, wheel supporting means therefor, a first rotary cutting unit embodying a rotary shaft supported vertically on and at the front of the body and cutting blades secured to the lower end of the shaft to be rotated in a horizontal plane, a guard plate overlying said blades and having a side positioned a substantial distance laterally of one side of the body, a second rotary cutting unit embodying a rotary shaft supported horizontally and positioned entirely outwardly beyond said one side of the body and cutting blades secured thereto to be rotated in a vertical plane, said vertical plane being tangent to a circular path defined by the outer ends of the blades of the first unit, means coupling the second unit with the body for vertical movement of the unit relative to the body, the second unit having a lowered working position in which the outer ends of the blades when rotating swing below the horizontal plane of the first unit blades, means forming a part of said guard plate and located outwardly from said one side of the body beyond said vertical plane for engaging and drawing grass to a position inwardly of said vertical plane and into said circular path, means for securing a prime mover on the body, and means for transmitting rotary power from the prime mover to the rotary shafts of said units.

4. The invention according to claim 3, wherein the said means for engaging and drawing grass inwardly embodies a plate having a slot in an edge thereof and which slot is arranged to open forwardly and laterally outwardly from the said vertical plane and a guard plate extending downwardly from the edge of the plate at the rear of the slot opening.

5. The invention according to claim 3, wherein said guard plate has a straight edge portion on the side remote from the body which extends in the direction of movement of the machine and the said means for engaging and drawing grass inwardly embodies a plate secured upon the guard plate and having a slot directed forwardly and outwardly, the plate having the slot therein having a depending guard plate at the rear outer side of said slot and terminating in an inwardly extending tongue spaced from and below the first guard plate between which tongue and first guard plate the outer ends of the blades pass.

6. In a power mowing machine, a wheel supported body, means for securing a prime mover thereon, a rotary mowing unit embodying a shaft mounted in vertical position for rotation at the front of the body and cutting blades secured to the lower end of the shaft for rotation in a horizontal plane, means for transmitting rotary movement from a prime mover on the body to said shaft, a guard disk secured to the body against movement above and concentric with the turning axis of said blades, and means at the peripheral portion of said disk laterally from the body for moving grass into the path of the blades comprising a plate in the form of a segment of a disk secured to said peripheral portion of the guard disk, said plate having a portion of its arcuate edge straight and having a grass gathering slot opening through said arcuate edge at one end of said straight portion, said slot opening being directed obliquely outwardly and forwardly with respect to the line of movement of the machine, a vertical guard plate joined to and depending from said straight portion, and a tongue extending inwardly from the bottom portion of the vertical guard plate between which tongue and first guard plate the outer ends of the blades pass.

References Cited in the file of this patent

UNITED STATES PATENTS

| | | |
|---|---|---|
| 2,618,919 | Hutchens | Nov. 25, 1952 |
| 2,622,384 | Velotta | Dec. 23, 1952 |
| 2,630,665 | Lauer | Mar. 10, 1953 |
| 2,707,361 | Thomas | May 3, 1955 |
| 2,708,818 | Gentry et al. | May 24, 1955 |
| 2,771,730 | True | Nov. 27, 1956 |